(12) United States Patent
Rogers, III et al.

(10) Patent No.: US 8,347,211 B1
(45) Date of Patent: Jan. 1, 2013

(54) IMMERSIVE MULTIMEDIA VIEWS FOR ITEMS

(75) Inventors: Charles S. Rogers, III, Seattle, WA (US); Aaron S. Wooster, Shoreline, WA (US)

(73) Assignee: Amazon Technologies, Inc., Reno, NV (US)

( * ) Notice: Subject to any disclaimer, the term of this patent is extended or adjusted under 35 U.S.C. 154(b) by 209 days.

(21) Appl. No.: 12/820,817

(22) Filed: Jun. 22, 2010

(51) Int. Cl.
*G06F 17/00* (2006.01)

(52) U.S. Cl. ........................................ 715/716

(58) Field of Classification Search ................... 715/716
See application file for complete search history.

(56) References Cited

U.S. PATENT DOCUMENTS

| | | | |
|---|---|---|---|
| 6,429,881 B1* | 8/2002 | Olsen, IV | 715/762 |
| 6,452,609 B1* | 9/2002 | Katinsky et al. | 715/716 |
| 7,502,036 B2* | 3/2009 | Kramer et al. | 345/629 |
| 7,620,600 B2* | 11/2009 | Patil et al. | 705/39 |
| 7,975,019 B1* | 7/2011 | Green et al. | 709/217 |
| 7,996,282 B1* | 8/2011 | Scott et al. | 705/27.2 |
| 2001/0025377 A1* | 9/2001 | Hinderks | 725/109 |
| 2002/0069218 A1* | 6/2002 | Sull et al. | 707/501.1 |
| 2003/0204573 A1* | 10/2003 | Beck et al. | 709/218 |
| 2005/0078087 A1* | 4/2005 | Gates et al. | 345/163 |
| 2005/0198571 A1* | 9/2005 | Kramer et al. | 715/517 |
| 2008/0019614 A1* | 1/2008 | Robertson et al. | 382/305 |
| 2008/0165081 A1* | 7/2008 | Lawther et al. | 345/1.2 |
| 2009/0013288 A1* | 1/2009 | Scheflan | 715/859 |
| 2009/0063299 A1* | 3/2009 | Amacker | 705/27 |
| 2009/0119595 A1* | 5/2009 | Morris et al. | 715/730 |
| 2009/0177538 A1* | 7/2009 | Brewer et al. | 705/14 |
| 2009/0265226 A1* | 10/2009 | Martiros | 705/14 |
| 2010/0100899 A1* | 4/2010 | Bradbury et al. | 725/29 |
| 2011/0018895 A1* | 1/2011 | Buzyn et al. | 345/594 |
| 2011/0055054 A1* | 3/2011 | Glasson | 705/27.2 |
| 2011/0137732 A1* | 6/2011 | Averbeck | 705/14.66 |

OTHER PUBLICATIONS

Endless.com, Example of Product View in Full Screen Mode, Copyright 2006-2010, retrieved May 17, 2010, 2 pages.

* cited by examiner

*Primary Examiner* — Doug Hutton, Jr.
*Assistant Examiner* — Andrew Dyer
(74) *Attorney, Agent, or Firm* — Thomas | Horstemeyer, LLP

(57) ABSTRACT

Disclosed are various embodiments for providing immersive multimedia views for items. A network page is generated that provides information regarding an item and includes code for rendering an immersive multimedia view for the item. A user interface presents a first one of a plurality of media objects associated with the item. The user interface includes a menu for selecting one of the media objects for presentation in the user interface and first set of media controls associated with the content form of the first one of the media objects. The user interface is updated to present a second one of the media objects having a different content form in response to a selection of the second one of the media objects in the menu. The first set of media controls is replaced with a second set of media controls that is associated with the different content form.

28 Claims, 7 Drawing Sheets

IMMERSIVE MULTIMEDIA VIEWS FOR ITEMS

BACKGROUND

Customers who are seeking to purchase products from online merchants may want to see what a product looks like and to read information about the product. However, customers may be disappointed with an image of the product if the image is of low quality or if the image does not show a particular angle of the product. Such disappointment may translate into a lost sale for the online merchant if the customer instead decides to purchase the product in person from a brick-and-mortar retail store.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to providing immersive multimedia views for items. As used herein, the term "item" refers to any good, product, service, software item, multimedia item, or other item that may be offered for sale, purchase, rental, lease, download, and any other form of consumption as can be appreciated. Embodiments of the present disclosure provide an enhanced experience for users of a network site by allowing the users to view high resolution media objects, for example, in a full browser window or a full screen format. While a detailed network page may provide access to a limited subset of media objects associated with an item, an immersive multimedia view provides an immersive experience that may allow a user to select from a multitude of media objects associated with an item. In various embodiments, users may be able to view media objects having different content forms within the same view. Accordingly, the media controls associated with the media object being presented in the immersive multimedia view may be updated when the media object changes. In the following discussion, a general description of the system and its components is provided, followed by a discussion of the operation of the same.

Figure 1:
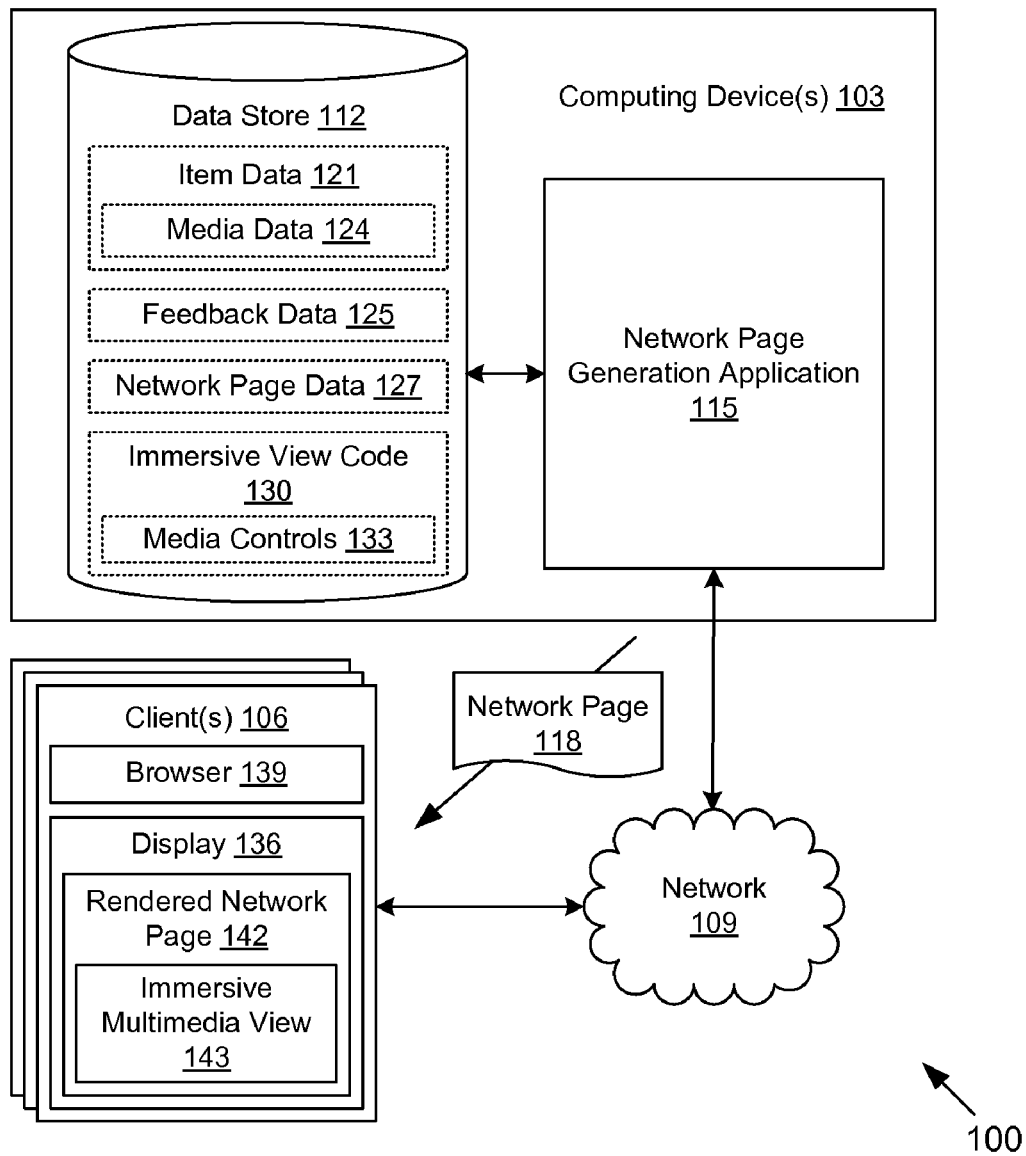
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a network page generation application 115, and other applications, services, processes, systems, engines, or functionality not discussed in detail herein. The network page generation application 115 is executed to generate network pages 118 associated with items, where the network page 118 includes code for rendering an immersive multimedia view in the client 106.

The data stored in the data store 112 includes, for example, item data 121, media data 124, feedback data 125, network page data 127, immersive view code 130, media controls 133, and potentially other data. The item data 121 may include any data relating to items presented on a network site, including, but not limited to, title, description, quantity, price, customer reviews, shipping specifications, options, and/or other data. In particular, the item data 121 includes media data 124 which comprises a plurality of media objects related to the item. The media data 124 may include any multimedia associated with an item such as, for example, high resolution images, thumbnail images, audio content, video content, annotated images, spinnable images, three-dimensional representations, interactive animations, and/or any other multimedia content forms that may be associated with an item. The feedback data 125 may comprise customer feedback relating to media objects, such as, for example, whether a media object was regarded as helpful by customers, customer ratings of a media object, and other customer feedback. The network page data 127 includes any data that may be used in generating network pages 118 to be sent to a client 106. To this end, network page data 127 may include templates, graphics, text, markup code such as hypertext markup language (HTML), extensible markup language (XML), and other markup code, executable code, interpreted code, and/or any other data that may be used in generating network pages 118.

The immersive view code 130 includes code that may be configured to render an immersive multimedia experience in a client 106. To this end, the immersive view code 130 may comprise dynamic HTML (DHTML), JAVASCRIPT, Ajax, FLASH, computer-assisted drafting (CAD) drawing plug-ins, and/or any other code that may be used to facilitate an interactive immersive multimedia experience in a web browser or other application. The immersive view code 130 may include one or more media controls 133. The media controls 133 are configured to allow a user to interact with and thereby control a media object. For example, media controls 133 may include components for controlling images such as components for image panning, components for image zooming, and/or other components. As another example, media controls 133 may include controls for the playback of video content, controls for the playback of audio content, controls for changing the orientation of a spinnable image, controls for changing the orientation of a three-dimensional representation in multiple dimensions, controls for viewing notes that mark up an annotated image, and/or other controls.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client 106 may include a display 136. The display 136 may comprise, for example, one or more devices such as cathode ray tubes (CRTs), liquid crystal display (LCD) screens, gas plasma-based flat panel displays, LCD Projectors, or other types of display devices, etc.

The client 106 may be configured to execute various applications such as a browser 139 and/or other applications. The browser 139 may be executed in a client 106, for example, to access and render network pages 118, such as web pages, or other network content served up by the computing device 103 and/or other servers. A rendered network page 142 may be displayed on the display 136, and an immersive multimedia view 143 may be rendered on top of or in conjunction with the rendered network page 142. The client 106 may be configured to execute applications beyond the browser 139 such as, for example, email applications, instant message applications, and/or other applications.

Next, a general description of the operation of the various components of the networked environment 100 is provided. To begin, a user at a client 106 requests one or more network pages 118 from the network page generation application 115. For example, the user may request a search result network page 118, a gateway network page 118, a category network page 118, a detailed network page 118 about an item, and/or other types of network pages 118. The requested network page 118 may describe one or more items. The following discussion will primarily be in the context of a single item, but the principles disclosed may be extended to multiple items described on a network page 118.

Various information regarding the item from the item data 121 may be included within the network page 118. As a non-limiting example, the network page 118 may feature a medium resolution item image and a plurality of thumbnail images showing alternate views of the item. The thumbnail images may lead to media objects having different content forms than merely images. For example, a thumbnail image may launch playback of a video within a display region on the rendered network page 142 or in a pop-up or pop-over window.

The network page 118 includes one or more components for launching an immersive multimedia view 143 of an item. Such components may comprise buttons, links, selectable images, and/or other components or configured functionality in order to launch an immersive multimedia view 143. The network page 118 includes code for rendering the immersive multimedia view 143 that is generated by the network page generation application 115 from the immersive view code 130.

When a user launches the immersive multimedia view 143 in the network page 118, a user interface is rendered on top of the rendered network page 142 in the browser 139. As a non-limiting example, the user interface may fill an entire window of the browser 139, an entire tab of the browser 139, or other display region or viewport within the browser 139. Alternatively, it may be configured by the user that the user interface will fill the entire display 136 when the immersive multimedia view 143 is in a full screen mode.

The immersive multimedia view 143 presents or features one or more media objects from a plurality of media objects associated with a given item in a high fidelity format, if available. The media objects may have a higher fidelity than any media objects included in a detailed network page 118 or other referring network page 118. For example, where the content form of the media object is an image, a high resolution image of the item may be presented such that the image fills the display area of the immersive multimedia view 143 in one or more dimensions. Media controls 133 may be provided within the immersive multimedia view 143 for controlling the presentation of the media object. For example, where the media object comprises a high resolution image, media controls 133 may comprise components for enabling panning of the image or components for zooming in to and zooming out from the image, and/or other components for manipulating the rendering of the image or facilitating interactivity with the image.

In various embodiments, one or more media controls 133 may be associated with a function of a mouse attached to the client 106. As a non-limiting example, for a media object that is an image, the scroll wheel on the mouse may enable a zoom function, while clicking and dragging on the image may allow a user to pan the image. As another non-limiting example, where the media object is video content, double clicking on the rendered video may start or stop playback of the video content, and the scroll wheel of the mouse may be tied to controlling the volume of the audio associated with the video content. Where the media object comprises a spinnable image, a mouse scroll wheel may be tied to rotating the orientation of the spinnable image. Further, clicking and dragging the mouse cursor may define a vector that is used in rotating the spinnable image.

The media objects and other data used in rendering the immersive multimedia view 143 may be preloaded or loaded on demand by the browser 139 in various embodiments. In one embodiment, the first media object presented in the immersive multimedia view 143 may be preloaded within the network page 118, but subsequent media objects may be loaded asynchronously or on demand when a user expresses an interest. The immersive multimedia view 143 and the rendered network page 142 that is used to launch the immersive multimedia view 143 will be further discussed below in the context of several non-limiting examples.

Figure 2:
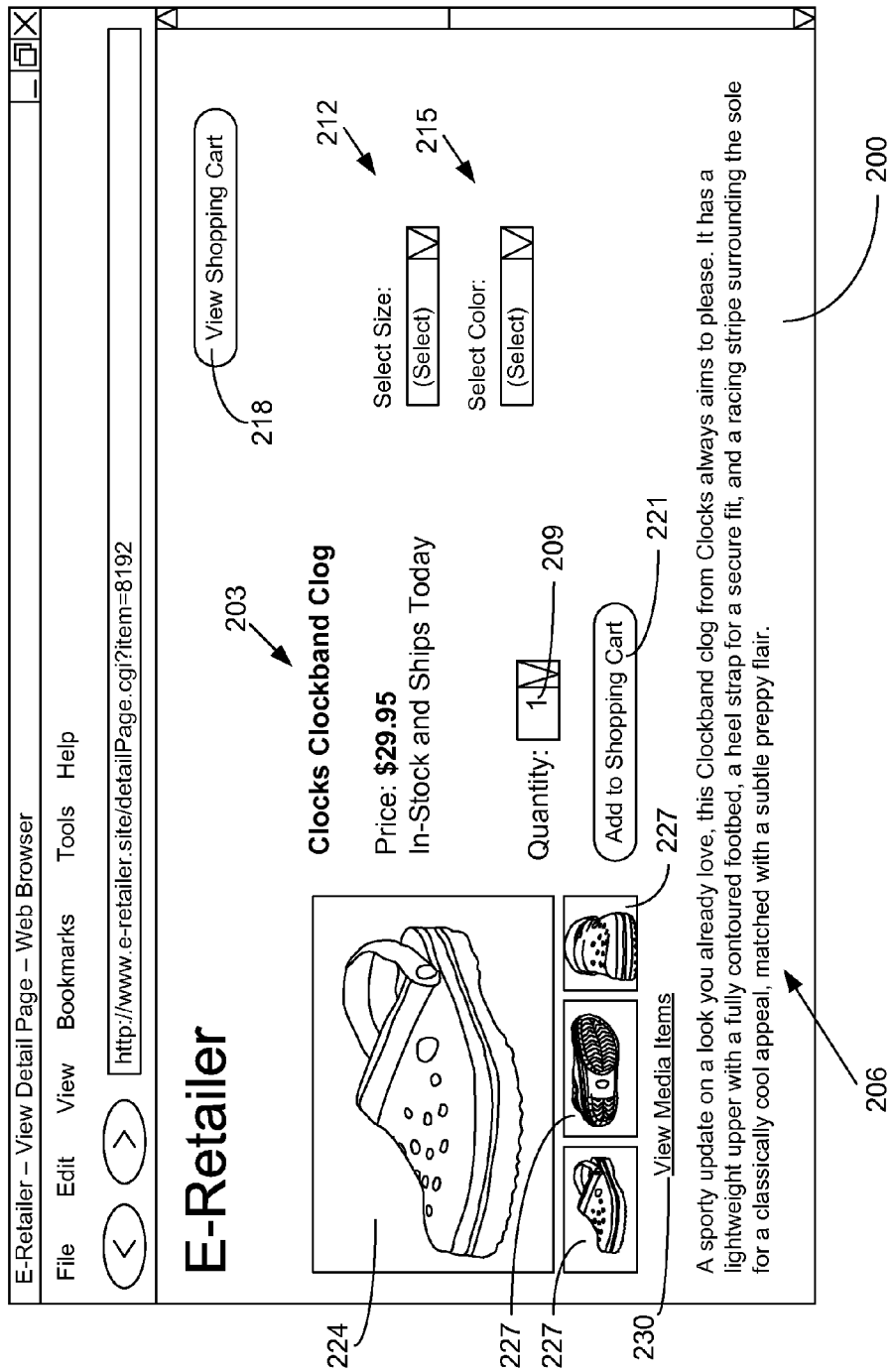
FIG. 2 is a drawing of an example of a detailed network page rendered in a client in the networked environment of FIG. 1 according to various embodiments of the present disclosure.

Referring next to FIG. 2, shown is one example of a detailed network page 200 rendered in a browser 139 (FIG. 1) executing in the client 106 (FIG. 1) in the networked environment 100 (FIG. 1). The detailed network page 200 facilitates launching of an immersive multimedia view 143 (FIG.

1). The detailed network page 200 includes various information from the item data 121 (FIG. 1) including item overview information 203 including title of the item, price of the item, and shipping status of the item, and item description information 206. Other information regarding the item may be present in other embodiments.

Various controls are provided in the detailed network page 200 including a quantity selection component 209, a size selection component 212, and a color selection component 215. Such components are presented in FIG. 2 as drop-down boxes, but they may be buttons, sliders, links, images, etc. in other embodiments. It is understood that other components for selecting options and features of an item may be present in other embodiments. The detailed network page 200 also includes a view shopping cart component 218 for viewing the shopping cart of the user or some other list of items associated with the user, and an add to shopping cart component 221 for adding the current item to the shopping cart of the user with the selected options and features. In other embodiments, the item may be added to other lists such as wish lists, user lists, gift registries, and/or other lists of items.

The detailed network page 200 also includes a primary image 224 of the item and a plurality of secondary images 227 of the item. The secondary images 227 of the item are presented as thumbnail images and may be configured to replace the primary image 224 with a selected secondary image 227 when selected by the user. Furthermore, a selection of a primary image 224 or a secondary image 227 may be configured to launch the immersive multimedia view 143 for the item with a media object associated with the selected image being initially presented in the immersive multimedia view 143. Alternatively, a component such as the link 230 labeled as "View Media Items" may be provided for launching the immersive multimedia view 143 for the item.

The detailed network page 200 presented in FIG. 2 is merely one example of a network page 118 that may be used to launch an immersive multimedia view 143 for an item. It is understood that an immersive multimedia view 143 for an item may be launched from a search results network page 118, a gateway network page 118, a category network page 118, and/or any other network page 118 that features items.

Figure 3:
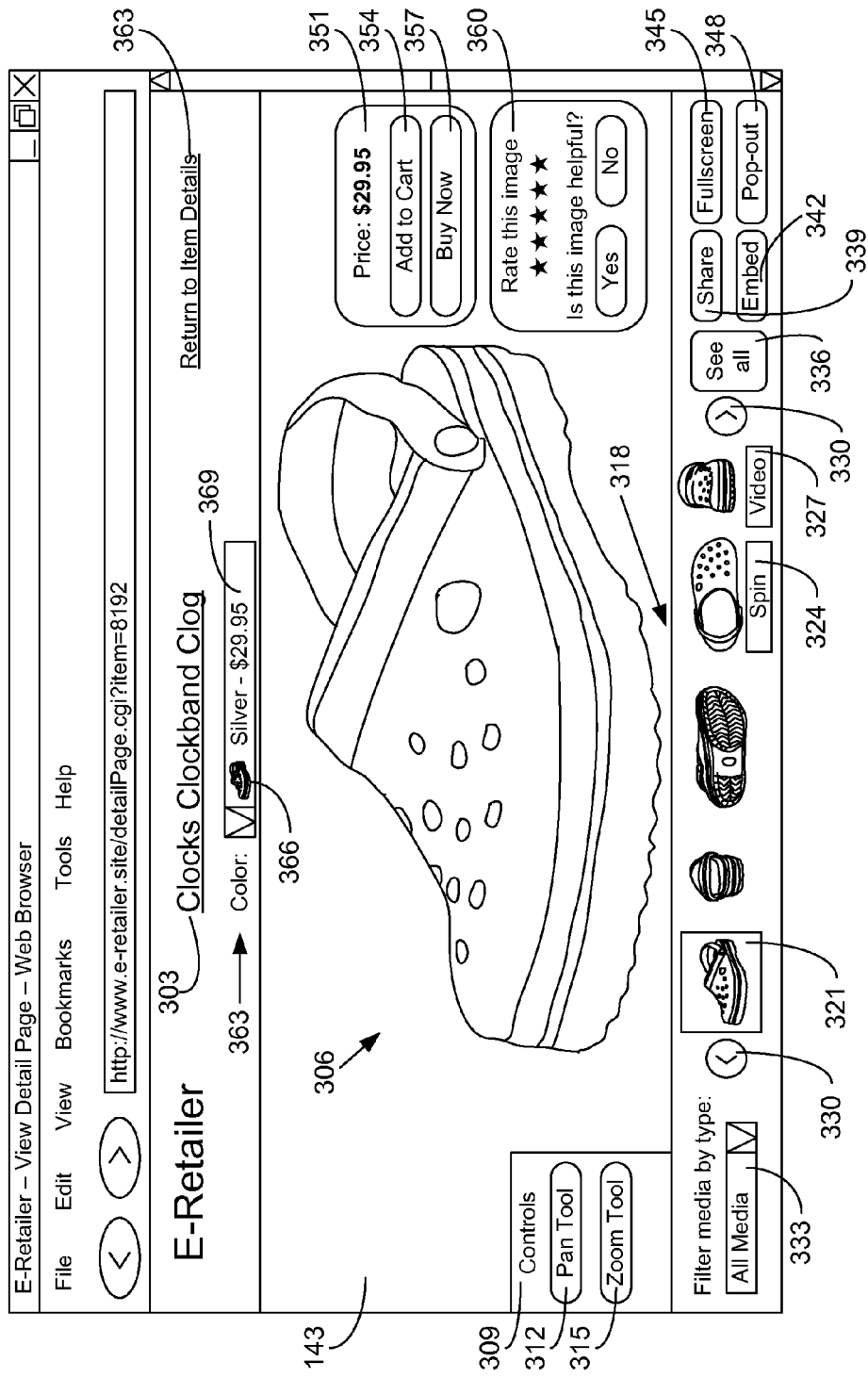
FIGS. 3-5 are drawings of examples of immersive multimedia views rendered in a client in the networked environment of FIG. 1 according to various embodiments of the present disclosure.

Turning now to FIG. 3, shown is one example of an immersive multimedia view 143 for an item which is rendered in a browser 139 (FIG. 1) executing in a client 106 (FIG. 1) in the networked environment 100 (FIG. 1). The immersive multimedia view 143 may include an item title 303, a featured media object 306, one or more media controls 309 related to the media object 306, and other features. The featured media object 306 that is rendered in the immersive multimedia view 143 comprises an image of the item. As another non-limiting example, if the featured media object 306 had a content form of audio, the rendering of the featured media object 306 may comprise a visualization of the audio. Because the featured media object 306 in FIG. 3 has a content form of an image, image controls are presented as the media controls 309 associated with featured media object 306. To this end, the media controls 309 include a pan tool component 312 and a zoom tool component 315, although other components may be included in other embodiments as desired.

A menu of media objects 318 may be provided for the user to select other media objects associated with the item for presentation in the immersive multimedia view 143. The menu of media objects 318 may include one or more indicia associated with the media objects such as thumbnail images, icons, buttons, links, and/or other indicia. The menu of media objects 318 may include a selected media object thumbnail 321, which is illustrated in FIG. 3 as a thumbnail image surrounded by a border. The media objects presented in the menu of media objects 318 are not limited to images. For example, the menu of media objects 318 may include a spinnable image thumbnail 324, a video thumbnail 327 and/or other indicia related to other content forms. In one embodiment, the sequence of media objects within the menu of media objects 318 may be prioritized based in part on feedback data 125 (FIG. 1) obtained for the various media objects.

The menu of media objects 318 may be configured to display only a proper subset of the media objects that are associated with the item. The subset of the media objects may be selectable using various components. To this end, the menu of media objects 318 may comprise a shoveler. For example, navigational buttons 330 may be provided to navigate within a list of media objects associated with the item. Other components may be provided in other embodiments, for example, scroll bars, sliders, and/or other components. The immersive multimedia view 143 may include a filter component 333 for filtering which media objects are included in the menu of media objects 318. The filtering component 333 may be configured by the user to filter the media objects by content form and/or other characteristics as desired.

The immersive multimedia view 143 may include a component 336 for showing the entire list of media objects associated with the item within the immersive multimedia view 143. An example of such a list will be discussed in connection with FIG. 5. A share component 339 may be provided for generating a link to the immersive multimedia view 143 that may be sent in an email message, text message, instant message, submitted in a form, or used elsewhere. The link may be configured such that the immersive multimedia view 143 will be presented with the same featured media object 306 and/or other options preselected from the link. An embed component 342 may be provided to generate code for embedding the immersive multimedia view 143 within a network page 118 or network site that may be editable by the user.

A full screen component 345 may be provided for launching a full screen rendering of the immersive multimedia view 143. A pop-out component 348 may be provided for launching the immersive multimedia view 143 in a separate window or tab of the browser 139, which may reveal the rendered network page 142 (FIG. 1) on top of which the immersive multimedia view 143 was rendered. The immersive multimedia view 143 being rendered in a separate window or tab may be configured with the same state as when rendered on top of the rendered network page 142. For example, if the featured media object 306 comprises video content that was playing when the pop-out component 348 was selected, the immersive multimedia view 143 may be configured to resume playback of the video content when rendered in the separate window or tab.

The immersive multimedia view 143 may also include a buy box 351 with information relating to the purchase, lease, rental, download, or other form of consumption related to the item. To this end, the buy box 351 may, for example, include a price of the item and/or other information relating to the item. The buy box 351 may include an add to cart component 354 for adding the item presented in the immersive multimedia view 143 to a shopping cart or other list of items associated with the user. The buy box 351 may also include a buy component 357 for initiating a purchase, rental, download, lease, or other form of consumption of the item.

The immersive multimedia view 143 may also include a rating component 360. The rating component 360 may, for example, display ratings and/or customer reviews associated with the item. The rating component 360 may enable a user to rate the item, for example, using a star scale, and indicate whether the featured media object 306 is helpful, or provide other review-related information. The immersive multimedia view 143 may include one or more components 363 configured to dismiss the immersive multimedia view 143 and return the window of the browser 139 to the rendered network page 142 such as the detailed network page 200 shown in FIG. 2.

The immersive multimedia view 143 may include a variation selection component 363 to enable a user to select one of several variations of the item. A variation of an item may relate, for example, size, style, format, color, and/or any other attribute associated with the item. The variation selection component 363 may comprise, for example, a drop-down box or another user interface component. The variation selection component 363 may include a variation indicium 366 and a variation description 369 for each variation of the item in some embodiments. As a non-limiting example, the variation indicium 366 may be an image or other media object that embodies the particular variation. The variation indicium 366 may depend on the current media object that is being presented in the immersive multimedia view 143. The variation description 369 may provide title, pricing, and other information for the variation. Selecting a variation through the variation selection component 363 may result in the updating of the media object featured in the immersive multimedia view 143 to depict the selected variation. Also, when the item is added to a list or a purchase of the item is initiated, the item may be added or purchased according to the selected variation.

Figure 4:
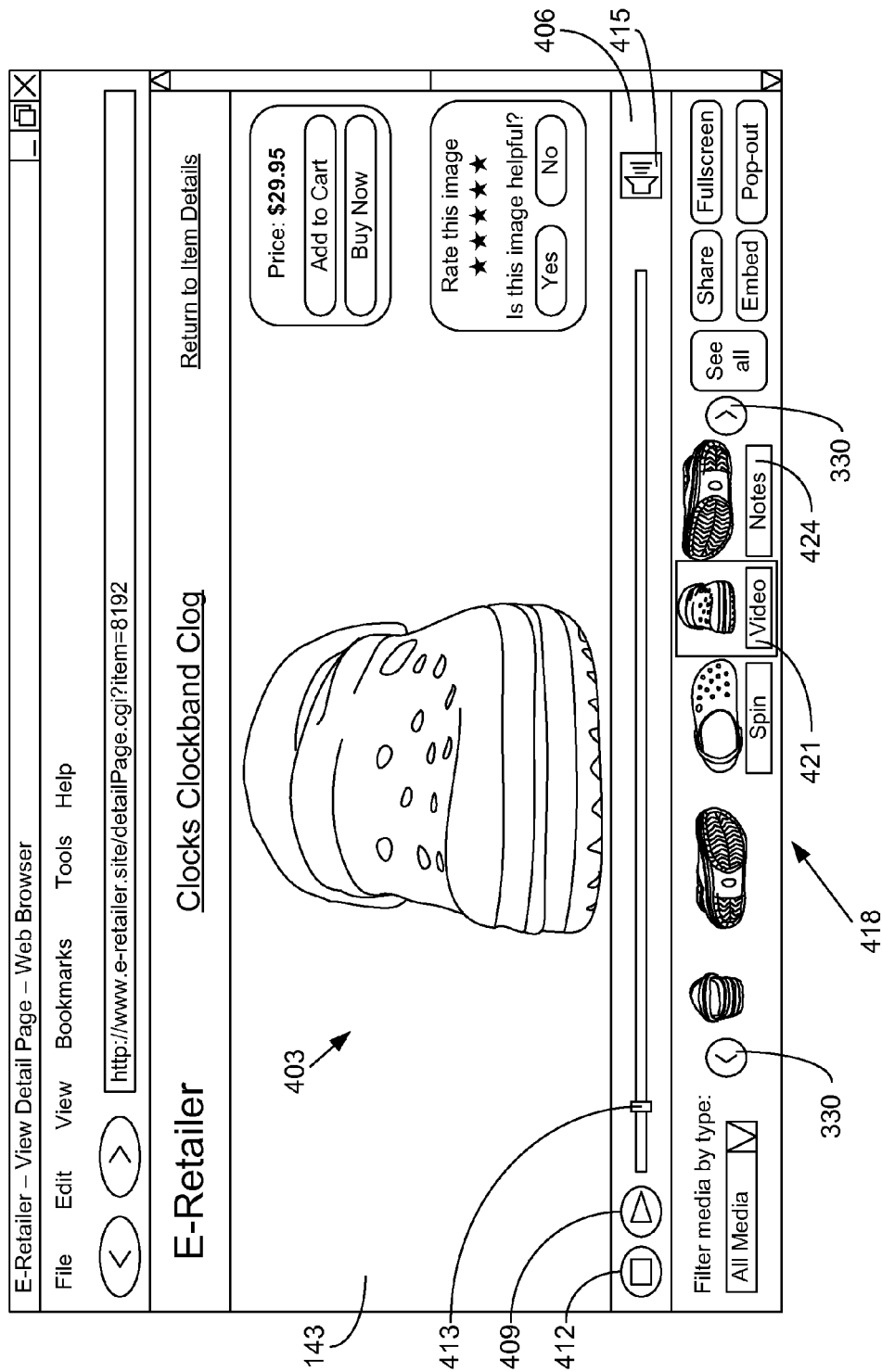

Moving on to FIG. 4, shown is another example of an immersive multimedia view 143 rendered in a browser 139 (FIG. 1) executing in a client 106 (FIG. 1) in the networked environment 100 (FIG. 1). The immersive multimedia view 143 presents a different featured media object 403 from the featured media object 306 of FIG. 3. The featured media object 403 corresponds to video content, which is a different content form than the image media object 306. To this end, video media controls 406 have replaced the image media controls 309 in FIG. 3. The video media controls 406 may include, for example, a play component 409, a stop component 412, a progress indication component 413, a volume component 415, and/or other components as desired for controlling playback or other features of video content.

The menu of media objects 418 is also shown as modified relative to the menu of media objects 318 in FIG. 3. The indicia corresponding to the media objects associated with the item have been advanced leftward such that each of the indicia has been moved to the left. Such movement within the menu of media objects 418 may be accomplished through the selection of one of the navigation components 330. The selected media object 421 corresponds to the featured media object 403. Newly appearing within the menu of media objects 418 is the thumbnail 424 corresponding to an annotated image of the item. The thumbnail 424 includes an indication that the media object 403 is associated with "notes."

Figure 5:
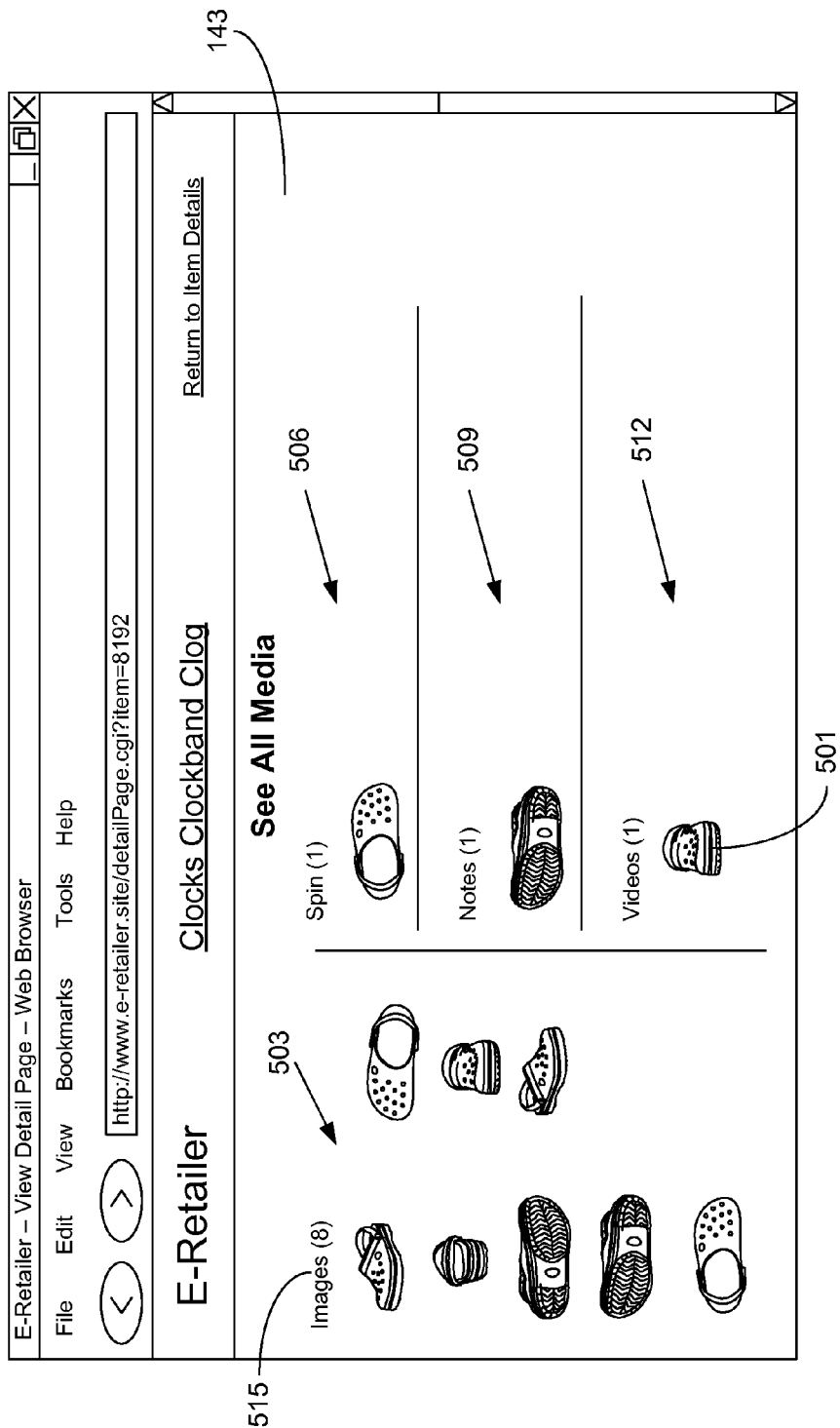

With reference to FIG. 5, shown is another example of an immersive multimedia view 143 rendered in a browser 139 (FIG. 1) executing in a client 106 (FIG. 1) in the networked environment 100 (FIG. 1). The immersive multimedia view 143 depicts indicia 501 corresponding to a complete listing of media objects that are associated with the given item. While a menu of media objects 318 (FIG. 3) or 418 (FIG. 4) may depict only a selectable subset of the media objects, the immersive multimedia view 143 may depict all of the media objects. Where the indicia 501 are too numerous to fit within a single screen, the immersive multimedia view 143 may include a scrollable viewport and/or other mechanism to display additional indicia 501 of media objects.

The indicia corresponding to the media objects may be grouped according to the content form of the media object. For example, a listing of image media objects 503, a listing of spinnable image media objects 506, a listing of annotated image media objects 509, a listing of video media objects 512, and other listings of other types of media objects may be provided in the immersive multimedia view 143. A numerical indication 515 may be provided near each of the groupings to indicate a quantity of media objects associated with that grouping.

Figure 6:
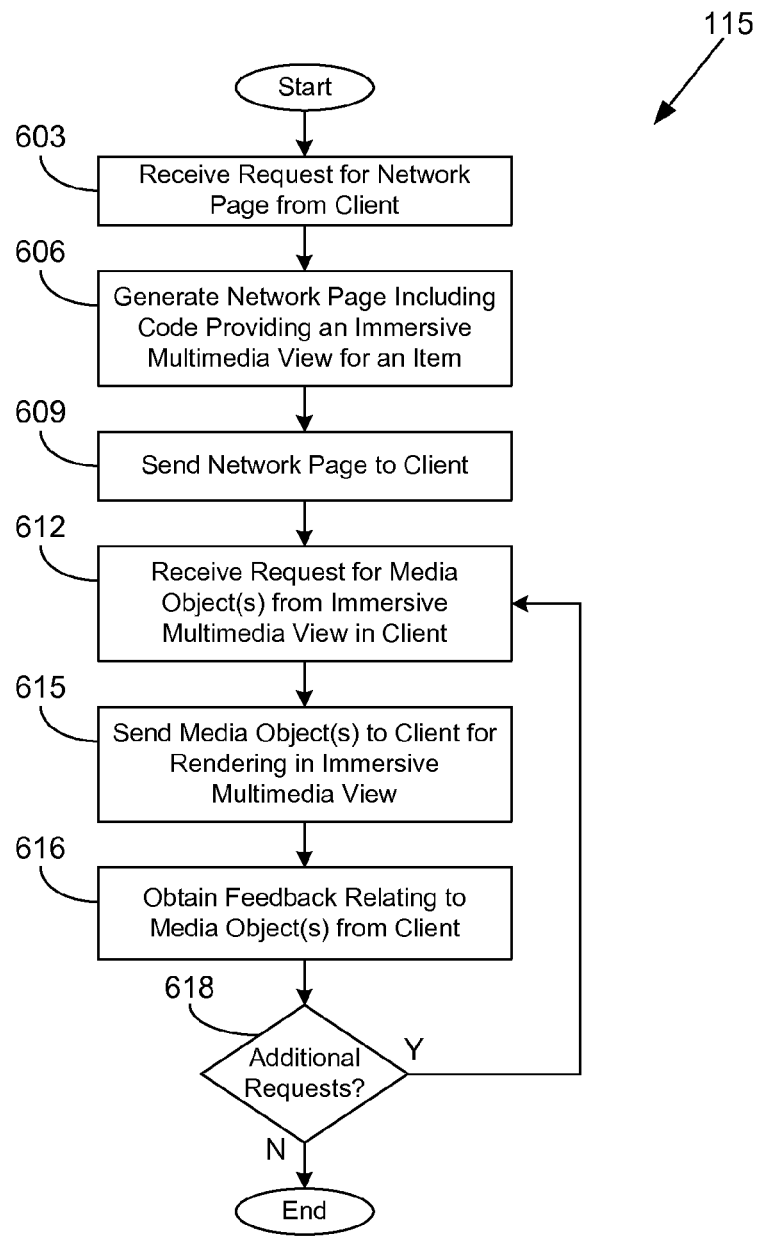
FIG. 6 is a flowchart illustrating one example of functionality implemented as portions of a network page generation application executed in a computing device in the networked environment of FIG. 1 according to various embodiments of the present disclosure.

Referring next to FIG. 6, shown is a flowchart that provides one example of the operation of a portion of the network page generation application 115 according to various embodiments. It is understood that the flowchart of FIG. 6 provides merely an example of the many different types of functional arrangements that may be employed to implement the operation of the portion of the network page generation application 115 as described herein. As an alternative, the flowchart of FIG. 6 may be viewed as depicting an example of steps of a method implemented in the computing device 103 (FIG. 1) according to one or more embodiments.

Beginning with box 603, the network page generation application 115 receives a request for a network page 118 (FIG. 1) from a client 106 (FIG. 1). In box 606, the network page generation application 115 generates the network page 118 including code for launching an immersive multimedia view 143 (FIG. 1) for an item. In box 609, the network page generation application 115 sends the network page 118, including the code providing the immersive multimedia view 143, to the client 106 over the network 109 (FIG. 1). The code that provides the immersive media view 143 may correspond to the immersive view code 130 (FIG. 1) stored in the data store 112 (FIG. 1) or may be generated dynamically from the immersive view code 130 in response to the request.

Next, in box 612, the network page generation application 115 receives a request for one or more media objects from the immersive multimedia view 143 being rendered in the client 106. Thereafter, in box 615, the network page generation application 115 sends data describing the media objects to the client 106 for rendering within the immersive multimedia view 143. In box 616, the network page generation application 115 may obtain feedback relating to one or more of the media objects from the client 106. The feedback may indicate, for example, preferences of a user for certain ones of the media objects and other feedback. The feedback, stored by the network page generation application 115 in the feedback data 125 (FIG. 1), may be used by the network page generation application 115 and the immersive view code 130 in prioritizing the display of media objects within the immersive multimedia view 143 and/or the rendered network page 142 (FIG. 1).

In box 618, the network page generation application 115 determines whether there are additional requests for media objects. Such requests may be generated by the code executing on the client 106 to obtain additional data as the user interacts with the immersive multimedia view 143. If there are additional requests for media objects, the network page generation application 115 returns to box 612 and processes the request(s) as previously described. If no additional requests are received, the portion of network page generation application 115 may end.

Figure 7:
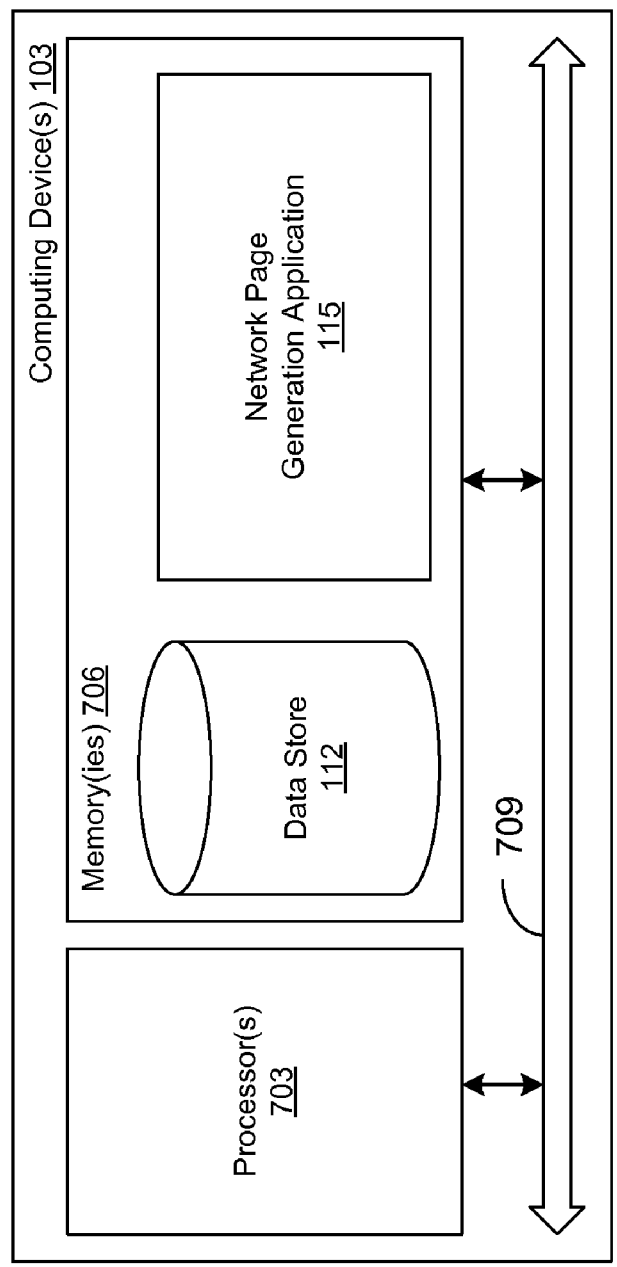
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 703 and a memory 706, both of which are coupled to a local interface 709. To this end, the computing device 103 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the network page generation application 115 and potentially other applications. Also stored in the memory 706 may be a data store 112 and other data. In addition, an operating system may be stored in the memory 706 and executable by the processor 703.

It is understood that there may be other applications that are stored in the memory 706 and are executable by the processors 703 as can be appreciated. Where any component discussed herein is implemented in the form of software, any one of a number of programming languages may be employed such as, for example, C, C++, C#, OBJECTIVE C, JAVA, JAVASCRIPT, PERL, PHP, VISUAL BASIC, PYTHON, Ruby, DELPHI, FLASH, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network 109 (FIG. 1) that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the network page generation application 115 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 6 shows the functionality and operation of an implementation of portions of the network page generation application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page generation application 115, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, comprising:
   code that renders a network page in a viewport of a browser window, the network page filling the viewport of the browser window, the network page including a primary image of the item at a particular resolution and text that describes an item;
   code that renders an immersive multimedia view for the item in the viewport on top of the network page, the immersive multimedia view being configured to fill the viewport and entirely cover the network page, the immersive multimedia view excluding the primary image of the item at the particular resolution and the text that describes the item, the immersive multimedia view presenting a first one of a plurality of media objects associated with the item, the first one of the media objects being an image, the immersive multimedia view including a menu for selecting one of the media objects for presentation and a set of image controls, the menu configured to render indicia corresponding to a selectable subset of the media objects, the set of image controls including at least one component for image panning and at least one component for image zooming, wherein the immersive multimedia view is initially configured as a pop-over window; and
   code that updates the immersive multimedia view to present a second one of the media objects having a different content form in response to a selection of the second one of the media objects in the menu, the set of image controls being replaced in the immersive multimedia view with a set of media controls associated with the different content form.

2. The computer-readable medium of claim 1, wherein the immersive multimedia view further includes a component for generating code for linking to the immersive multimedia view for the item.

3. The computer-readable medium of claim 1, wherein the immersive multimedia view further includes a component for filtering the selectable subset of the media objects by content form.

4. The computer-readable medium of claim 1, wherein the image has a higher resolution than any other image rendered in the network page.

5. A system, comprising:
   at least one computing device; and
   a network page generation application executable in the at least one computing device, the network page generation application comprising:
   logic that generates a network page providing information regarding an item, the network page being configured to fill a browser display area in a client when rendered, the network page including a primary image of the item at a particular resolution and text that describes the item, the network page including code for rendering an immersive multimedia view for the item, the code comprising:
   code that renders a user interface which fills the browser display area and entirely covers the network page in the client, the user interface excluding the primary image of the item at the particular resolution and the text that describes the item, the user interface presenting a first one of a plurality of media objects associated with the item, the first one of the media objects having a content form, the user interface including a menu for selecting one of the media objects for presentation in the user interface and a first set of media controls associated with the content form, wherein the content form is an image and the first set of media controls includes at least one component for image panning and at least one component for image zooming, and wherein the user interface is initially configured as a pop-over window; and
   code that updates the user interface to present a second one of the media objects having a different content form in response to a selection of the second one of the media objects in the menu, the first set of media controls being replaced in the user interface with a second set of media controls associated with the different content form.

6. The system of claim 5, wherein the user interface includes a component for updating the user interface to provide indicia corresponding to each one of the media objects.

7. The system of claim 5, wherein the menu includes components for selecting one of a proper subset of the media objects for presentation.

8. The system of claim 5, wherein the network page includes a menu for selecting one of a proper subset of the media objects for presentation.

9. The system of claim 8, wherein the immersive multimedia view is rendered when one of the proper subset of the media objects is selected from the menu included in the network page, the one of the proper subset of the media objects being the first one of the media objects presented in the user interface.

10. The system of claim 5, wherein the content form is selected from the group consisting of: an image, a spinnable image, a three-dimensional representation of the item, and an image marked up with notes.

11. The system of claim 5, wherein the browser display area comprises a browser window.

12. The system of claim 5, wherein the first one of the media objects is of a higher fidelity than at least another one of the media objects that is included in the network page.

13. The system of claim 12, wherein the first one of the media objects has a graphical representation that fills the browser display area in at least one dimension.

14. The system of claim 5, wherein the second one of the media objects is selected from the group consisting of: video content and audio content.

15. The system of claim 5, wherein the second one of the media objects comprises video content associated with the item, and the second set of media controls includes at least one component for controlling playback of the video content.

16. The system of claim 5, wherein the first one of the media objects comprises a spinnable image of the item, and the first set of media controls includes at least one component for controlling an orientation of the spinnable image.

17. The system of claim 5, wherein the second one of the media objects comprises audio content associated with the item, and the second set of media controls includes at least one component for controlling playback of the audio content.

18. The system of claim 17, wherein the user interface includes a visualization of the audio content.

19. The system of claim 5, wherein the user interface includes at least one component for adding the item to a list of items associated with a user.

20. The system of claim 5, wherein the user interface includes at least one component for initiating a purchase of the item.

21. The system of claim 5, wherein the user interface includes at least one component for dismissing the user interface and returning to the network page.

22. The system of claim 5, wherein the network page generation application further comprises:
    logic that obtains a request for the second one of the media objects from a client; and
    logic that sends the second one of the media objects to the client for rendering in the user interface in response to the request.

23. The system of claim 5, wherein the network page generation application further comprises:
    logic that obtains feedback relating to the first one of the media objects from a client; and
    logic that prioritizes the first one of the media objects in the menu based at least in part on the feedback.

24. The system of claim 5, wherein one of the first set of media controls assigns a media control to a mouse function, and one of the second set of media controls assigns a different media control to the mouse function.

25. The system of claim 5, wherein the user interface includes a component for selecting a variation of the item.

26. A method, comprising the steps of:
    rendering, in a computing device, a network page in a browser, the network page filling a viewport of the browser, the network page including a primary image of an item at a particular resolution and text that describes the item;
    rendering, in the computing device, an immersive multimedia view for the item on top of the network page in the viewport and thereby filling the viewport, the immersive multimedia view excluding the primary image of the item at the particular resolution and the text that describes the item, the immersive multimedia view featuring a first one of a plurality of media objects, the first one of the media objects having a content type, the immersive multimedia view including a menu for selecting one of the media objects for featuring within the immersive multimedia view and a set of media controls associated with the content type, wherein the content form is an image and the set of image controls includes at least one component for image panning and at least one component for image zooming, wherein the immersive multimedia view is initially configured as a pop-over window; and
    updating, in the computing device, the immersive multimedia view to feature a second one of the media objects in place of the first one of the media objects in response to a selection of the second one of the media objects in the menu, the second one of the media objects having a different content type, a different set of media controls associated with the different content type replacing the set of media controls in the immersive multimedia view.

27. The method of claim 26, further comprising the step of obtaining, in the computing device, at least a portion of data associated with the second one of the media objects from a server in response to the selection of the second one of the media objects in the menu.

28. The method of claim 26, further comprising the step of rendering the immersive multimedia view to fill a screen of the computing device.

\* \* \* \* \*